(12) United States Patent
Pytlarz et al.

(10) Patent No.: US 11,019,302 B2
(45) Date of Patent: May 25, 2021

(54) FRAME RATE CONVERSION METADATA

(71) Applicant: Dolby Laboratories Licensing Corporation, San Francisco, CA (US)

(72) Inventors: Jaclyn Anne Pytlarz, Santa Clara, CA (US); Robin Atkins, San Jose, CA (US); Elizabeth G. Pieri, Santa Clara, CA (US); Alexandre Chapiro, Sunnyvale, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/650,821

(22) PCT Filed: Sep. 27, 2018

(86) PCT No.: PCT/US2018/053186
§ 371 (c)(1),
(2) Date: Mar. 25, 2020

(87) PCT Pub. No.: WO2019/067762
PCT Pub. Date: Apr. 4, 2019

(65) Prior Publication Data
US 2020/0275050 A1    Aug. 27, 2020

Related U.S. Application Data

(60) Provisional application No. 62/564,500, filed on Sep. 28, 2017, provisional application No. 62/648,795, filed on Mar. 27, 2018.

(30) Foreign Application Priority Data

Nov. 6, 2017    (EP) ..................... 17200106

(51) Int. Cl.
*H04N 7/01*    (2006.01)

(52) U.S. Cl.
CPC .......... *H04N 7/013* (2013.01); *H04N 7/0125* (2013.01); *H04N 7/0135* (2013.01)

(58) Field of Classification Search
CPC ........ H04N 7/01; H04N 7/012; H04N 7/0125; H04N 7/013; H04N 7/0135; H04N 11/20
(Continued)

(56) References Cited

U.S. PATENT DOCUMENTS

2016/0360212 A1* 12/2016 Dai .................... H04N 19/36
2017/0026646 A1*  1/2017 Minoo ................ H04N 19/124
(Continued)

FOREIGN PATENT DOCUMENTS

WO    2016054076    4/2016
WO    2016128138    8/2016
(Continued)

*Primary Examiner* — Sherrie Hsia

(57) ABSTRACT

Methods for encoding and decoding high-dynamic range signals are presented. The signals are encoded in a high frame rate and are accompanied by frame-rate conversion metadata defining a preferred set of frame-rate down-conversion parameters, which are determined according to the maximum luminance of a target display, display playback priority modes, or judder control modes. A decoder uses the frame-rate conversion metadata to apply frame-rate down-conversion to the input high-frame-rate signal according to at least the maximum luminance of the target display and/or the characteristics of the signal itself. Frame-based and pixel-based frame-rate conversions, and judder models for judder control via metadata are also discussed.

24 Claims, 4 Drawing Sheets

(58) Field of Classification Search
USPC .................. 348/441, 443, 446–448, 458, 459
See application file for complete search history.

(56) References Cited

U.S. PATENT DOCUMENTS

| | | |
|---|---|---|
| 2017/0054938 A1 | 2/2017 | Xu |
| 2017/0264861 A1 | 9/2017 | Xu |
| 2018/0018932 A1 | 1/2018 | Atkins |

FOREIGN PATENT DOCUMENTS

| | | |
|---|---|---|
| WO | 2017146972 | 8/2017 |
| WO | 2017205702 | 11/2017 |

\* cited by examiner

FRAME RATE CONVERSION METADATA

CROSS-REFERENCE TO RELATED APPLICATIONS

This patent application claims the benefit of priority from U.S. Provisional Patent Application, Ser. No. 62/564,500, filed on 28 Sep. 2017; European Patent Application No. 17200106.7, filed on 6 Nov. 2017; and U.S. Provisional Patent Application Ser. No. 62/648,795, filed on 27 Mar. 2018, each one incorporated by reference in its entirety.

TECHNOLOGY

The present invention relates generally to images. More particularly, an embodiment of the present invention relates to metadata to be used for frame-rate conversion in video sequences.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a context is explicitly specified to have particular significance at any point in the description herein, it should be inferred that the term may be used in either context, e.g. interchangeably.

As used herein, the term high dynamic range (HDR) relates to a DR breadth that spans some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). Using gamma-domain or other perceptual-domain luminance coding, images where $n \leq 8$ (e.g., color 24-bit JPEG images) are considered images of standard dynamic range, while images where $n > 8$ may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

High Dynamic Range (HDR) content authoring is now becoming widespread as this technology offers more realistic and lifelike images than earlier formats. However, many display systems, including hundreds of millions of consumer-television displays, are not capable of reproducing HDR images. Furthermore, consumer HDR displays may not match the characteristics of the HDR display being used at the studio. To improve existing display schemes, as appreciated by the inventors here, improved techniques for mapping HDR images into HDR and SDR displays are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
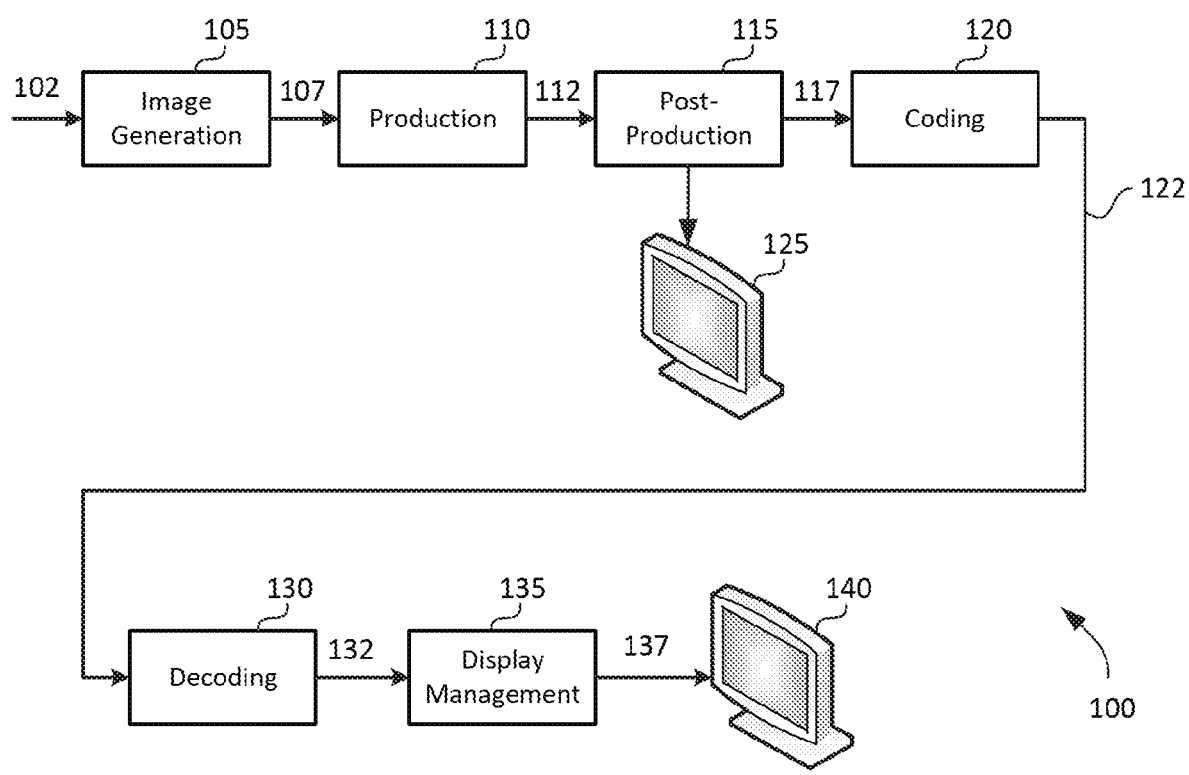
FIG. 1 depicts an example process for a video delivery pipeline.

Methods for frame-rate conversion via metadata are described. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, to avoid unnecessarily occluding, obscuring, or obfuscating the present invention.

Overview

Example embodiments described herein relate to methods for adjusting the playback frame rate of HDR video via metadata. An encoder receives a high-frame-rate HDR video signal. It determines a set of frame-rate down-conversion parameters for the high frame-rate HDR video based at least on the maximum brightness of a target display. It generates frame-rate-conversion metadata based on the frame-rate down-conversion parameters, and generates a coded bitstream based on the high-frame-rate HDR video and the frame-rate-conversion metadata.

In another embodiment, a decoder receives an input HDR video signal encoded in an input high-frame rate. It also receives frame-rate-conversion metadata associated with the input video signal. It determines the maximum brightness of a target display. It determines a set of frame-rate down-converting parameters based at least on the maximum brightness of the target display and the frame-rate-conversion metadata, and it generates an output video signal for the target display at an output frame rate based on the input video signal and the set of frame-rate down-converting parameters, wherein the output frame rate is equal or lower to the input high frame rate.

In at least one embodiment, an encoder encodes a high-dynamic range (HDR) video signal. The encoder accesses an HDR video signal encoded at a first frame rate; the first frame rate may be, for example, a frame rate that is higher than typical prior practice, such as at least 30 frames per second (fps) for film (cinema) (e.g., 48 fps) and at least 60 fps for video (e.g., streaming or broadcasting). The encoder determines a set of frame-rate down-conversion parameters suitable for adapting the HDR video signal for playback at a second frame rate, the second frame rate being lower than the first frame rate; the second frame rate may be, for example, a frame rate that conforms to typical prior practice, such as 24 fps for film, 50 fps for PAL interlaced video, and 60 fps for NTSC interlaced video. In principle, the second frame rate may in some circumstances be below typical prior practice. The set of frame-rate down-conversion parameters comprises: (i) a down-conversion factor suitable for determining, at a target display, the second frame rate; or (ii) metadata from which the down-conversion factor can be obtained. Said determining of the second frame rate may be done in dependence on at least a maximum brightness of the target display. In general, if a first target display has a significantly higher maximum brightness than that of a second target display, and said determining does not take other factors into account, then the second frame rate determined for the first target display will be higher than that of the second target display. For example, for a target display with a maximum brightness of 100 nits the second frame rate may be determined to be one quarter of the first frame rate; for a target display with a maximum brightness of 400 nits the second frame rate may be determined to be one third of the first frame rate; and for a target display with a maximum brightness of 600 nits the second frame rate may be determined to be one half of the first frame rate. It should be noted, however, that where said determining takes other factors into account, the relationship whereby the second frame rate increases with the maximum brightness may not hold for all cases.

Frame Rate Conversion
Video Coding of HDR Signals

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors, contrast, or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Frame-Rate Conversion in Television Sets

In LCD or LED television sets (TVs), to address the slow gray-to-gray response time of the LCD panels, which may cause display motion blur and other artifacts, manufacturers have increased the refresh rate in the panels. Thus, while input video is typically delivered at 24, 30, 50, or 60 frames per second, modern LCD TVs refresh their panels at 120 Hz, 240 Hz, or higher.

To accommodate for the higher refresh rate, TVs with high refresh rates may use a variety of frame interpolation schemes: from simple frame duplication to sophisticated motion-based interpolation techniques. Such TVs may also allow users to control "the smoothness of motion" according to their preferences; however, high-frame-rate interpolation does not come without problems.

For example, one side-effect of this approach is the so called "soap opera effect," where movies displayed using high frame rate interpolation lose their "cinematic look" and appear like TV "soap operas" (TV-specific content, typically displayed at 60 fps (interlaced) instead of the cinematic 24 fps).

Some of these problems are further exacerbated on HDR television sets. For example, it appears that many artifacts, just as judder (jerkiness of the video), which are typically ignored or missed in SDR TVs, but are enhanced and more noticeable in HDR TVs due to their higher brightness and contrast.

Given that down-converting from a high frame rate to a lower frame rate yields fewer artifacts than up-converting from a low frame rate to a higher one, and given the existing issues with high-frame-rate HDR TV sets, in example embodiments, an encoder transmits video content at a high frame rate (e.g., at 120 fps). As used herein, the term "high frame rate" denotes a frame rate that is higher than typical prior practice. For example, without limitation, examples of standard frame rates include: 24 frames per second (fps) for film, 50 fps for PAL interlaced video, and 60 fps for NTSC interlaced video. Without limitation, examples of high-frame rate would be: at least 30 fps for film (cinema) (e.g., 48 fps) and at least 60 fps for video (e.g., streaming or broadcasting).

In an embodiment, the high-frame-rate content is also accompanied by frame-rate-conversion metadata which enable decoders to down-convert the incoming video according to the dynamic range and refresh rate of the target display, thus better matching the look of the original. By transmitting both high frame rate video and the frame rate down-conversion metadata this system satisfies all users between the two extreme cases:

a) viewers who prefer smooth motion (e.g., with no cinematic judder)

b) viewers who prefer an artistically created "cinematic look"

In an embodiment, techniques presented herein may also be used in combination with other de-juddering techniques, for example, as those disclosed in U.S. Patent Publication No. 2017/0054938, *"Systems and Methods to Control Judder Visibility,"* by N. Xu et al., and U.S. Patent Publication No. 2017/0264861, *"Dual-Ended Metadata for Judder Visibility Control,"* by N. Xu et al., each one incorporated herein by reference.

Frame-Rate Conversion Metadata

In an embodiment, frame-rate-conversion metadata may be adapted at the whole sequence, at the scene level, at the frame level, or any other suitable time interval. These frame-rate-conversion metadata refer to the viewable frame rate, not the transmitted frame rate. This frame rate metadata may be chosen by a content producer during the post-production phase (115) (e.g., manually or by a combination of computer-based tools and human interaction) or they may be derived automatically based on scene characteristics during post-production or as part of the encoding phase (120). For example, during post-production, one may apply a variety of down-converting filters and select the one considered the best for each target display. As another example, a scene with fast movement may have metadata specifying a higher frame rate than a scene with slow movement. Regardless of how frame-rate-conversion metadata is selected, sending high frame rate signals ensures on a receiver that the display device rarely needs to perform up-sampling, and the existing frame rate conversions can be mostly bypassed, thus improving overall video quality.

Human perception of frame rate and frame-rate related distortions such as judder, is also dependent on the adaptation level of the person. Therefore, on displays of differing luminance capabilities it may be desirable to adapt the target frame-rate based on information about the desired target frame rate, the mastering monitor capabilities, and the ambient surround conditions.

EXAMPLES

In a first example, consider the following parameters:
Input frame rate: 120 fps
Target dynamic range: 100 nits
Target display frame rate: 30 fps
Such a system requires a 4-to-1 frame down-conversion. Assuming that the same down-converting filter is applied to all pixels of a frame, given down-conversion metadata $C=[c_0\ c_1\ c_2\ c_3]$, where $c_k$, k=0, 1, 2, 3 denote the down-conversion filtering coefficients (e.g., C=[0.5, 0.5, 0, 0]), for the input frames $f_1(i)$, i=0, 1, 2, ... M−1, output frames may be generated as $$f_d(i,j)=c_0 f_1(4i,j)+c_1 f_1(4i+1,j)+c_2 f_1(4i+2,j)+c_3 f_1(4i+3,j), \quad (1)$$

where $f_d(i,j)$ denotes the j-th pixel in the i-th down-converted (or output) frame, for i=0, 1, ..., N−1, and, for this example, N=M/4. Similarly, $f_1(i,j)$ denotes the j-th pixel in the i-th input frame.

In a second example, consider the following parameters:
Input frame rate: 120 fps
Target DR: 600 nits
Target frame rate: 60 fps
Such a system requires a 2-to-1 frame down-conversion. Given $C=[c_0\ c_1]$ (e.g., C=[0.5 0.5]), output frames may be generated as $$f_d(i,j)=c_0 f_1(2i,j)+c_1 f_1(2i+1,j), i=0,1,\ldots,N-1. \quad (2)$$

In a third example, the system parameters are:
Input frame rate: 120 fps
Target DR: 600 nits
Target frame rate: 60 fps
Such a system requires again a 2-to-1 frame down-conversion; however, the director may want to maintain the film blur, thus the down-converting filter may be given by a different filter than in the second example, say C=[0.25 0.25 0.25 0.25], and $$f_d(i,j)=0.25((f_1(2i,j)+f_1(2i+1,j)+f_1(2i+2,j)+f_1(2i+3,j)), \\ i=0,1,\ldots,N-1. \quad (3)$$

In an embodiment, frame-rate conversion metadata may include: the order of the down-converting filter, the filtering coefficients (e.g., vector C), the preferred down-conversion factor (e.g., 4:1) (or alternatively, the preferred output frame rate), and the target maximum luminance rate. Some embodiments may include addition metadata parameters, such as surrounding ambient light for the target display and the video's playback "priority mode." As used herein, the term "priority mode" denotes whether a video frame that combines video and graphics can be considered primarily a "video" frame, a "graphics" frame, or a "transitioning" frame, transitioning between video and graphics or vice versa.

The concept of playback priority modes was introduced by one of the inventors in PCT Application Ser. No. PCT/US2017/034593, (the '593 Application) *"Transitioning between video priority and graphics priority,"* filed on May 25, 2017, and incorporated herein by reference in its entirety, and it allowed the display management (e.g., process 135) to be optimized based on whether the content to be displayed was predominantly video, or graphics, or in a transition mode between the two modes.

More specifically, as discussed in the '593 Application, in display management, incoming HDR data are mapped to the target display based on a mapping curve. Typically, the characteristics of such a mapping curve are determined based on the characteristics of the input signal (e.g., minimum, maximum, and average brightness values, contrast, and the like), which can be determined via input signal metadata, and the characteristics of the target display (e.g., minimum, maximum, and average display brightness, contrast, and the like), which may be determined directly from the display, say by retrieving the display's extended display identification data (EDID).

In some embodiments, playback may switch between a "video priority mode," where display management is based on dynamic (fast-changing) metadata, and a "graphics priority mode," where display management is based on static (slow-changing) metadata. For example, if a sequence of video frames is primarily graphics (say, there is a screen menu overlaid on top of the video) and one applies dynamic metadata, video playback may look jerky. A third, "priority transition mode," allows for modes to be smoothly interpolated in between the two primary modes.

The concept of priority modes may apply into frame-rate conversion as well. For example, in an embodiment, a receiver may decide to use different down-conversion filters among the video, graphics, and/or transition playback priority modes. As an example, Table 1 depicts an example look-up table of frame-conversion metadata which could be communicated as part of a bitstream. The down-conversion factor can be obtained from this metadata. Without limitation, in an embodiment, the frame rate is lowered whenever the average luminance in a scene changes due to tone mapping. For example, dark scenes in an HDR film will not be tone-mapped at all when the target display is 100 nits, thus there is no need to change the frame rate for those scenes. On the other hand, bright scenes will be tone-mapped the most, thus requiring using a lower frame rate for displaying those scenes.

TABLE 1

Example Frame-conversion Metadata

| Down-sampling factor | Filter coefficients | Target display (nits) | Priority Mode |
|---|---|---|---|
| 4:1 | 0.5 0.5 0 0 | 100 | video |
| 3:1 | ⅓ ⅓ ⅓ | 400 | graphics |
| 2:1 | 0.5 0.5 | 600 | video |
| 2:1 | 0.25 0.25 0.25 0.25 | 600 | video |
| 3:1 | ¼ ½ ¼ | 800 | transition |
| 4:1 | Alpha priority map, $C_V$ coefficients for video, $C_G$ coefficients for graphics | 800 | Pixel-based blending |

These priority modes provide a trade-off between video quality and stability for the graphics; however, while it is desirable to have the best video quality and the best stability for the graphics, this may not be possible when a priority is selected for the entire image. In U.S. Patent Publication No. 2018/0018932, "Transitioning between video priority and graphics priority," filed on Sep. 28, 2017, which is a Continuation in Part (CIP) of the '593 Application, and which is incorporated herein by reference in its entirety, a new "pixel-based blending" or "per-pixel priority" mode was introduced. Under this mode, as depicted in the last row of Table 1, metadata may include an "alpha" (or blending) priority map which characterizes whether one or more pixels in a blended image have "video priority" or "graphics priority," and the corresponding down-converting filters, e.g., a $C_V$ vector of filter coefficients for video and a $C_G$ vector of coefficients for graphics. In one embodiment, the blending priority map may have only binary values (e.g., 0 or 1), but in another embodiment, it may include values in [0, 1] or some other suitable range and representation.

In an embodiment, assuming a map value of $\alpha(j)=1$ indicates that the j-th pixel has a graphics priority, then if $\alpha(j)=1$, then generate the j-th output pixel by applying the $C_G$ set of down-converting coefficients;

else if $\alpha(j)=0$ generate the j-th output pixel by applying the $C_V$ set of down-converting coefficients;

else blend the two outputs using the $\alpha(j)$ value, which, may be expressed as:

$$f_d(i,j)=\alpha(j)F(C_G)+(1-\alpha(j))F(f_1,C_V), \quad (4)$$

where $f_d(i,j)$ denotes pixel j of the i-th output down-sampled frame, $F(f_1, C_G)$ denotes a function of the input frames based on the $C_G$ down-converting coefficients, and $F(f_1, C_V)$ denotes a function of the input frames based on the $C_V$ down-converting coefficients. For example, given a 4:1 down-conversion with pixel-based blending, equation (4) may be expressed as:

$$f_g(i,j)=C_G(0)f_1(4i,j)+C_G(1)f_1(4i+1,j)+C_G(2)f_1(4i+2,j)+C_G(3)f_1(4i+3,j);$$

$$f_v(i,j)=C_V(0)f_1(4i,j)+C_V(1)f_1(4i+1,j)+C_V(2)f_1(4i+2,j)+C_V(3)f_1(4i+3,j);$$

$$f_d(i,j)=\alpha(j)f_g(i,j)+(1-\alpha(j))f_v(i,j),$$

where $C_G(k)$ and $C_V(k)$, for k=0 to 3, denote respectively the down-converting filtering coefficients for the graphics and video priority modes.

In some embodiments, it may be desirable to not apply any frame interpolation to graphics pixels, e.g., $C_G(k)=0$, for all down-converting filter coefficients.

In some embodiments, the received frame-conversion metadata (e.g., as depicted in Table 1), may not cover the exact characteristics of the target display. For example, the data may include filtering values for target displays at 400, 800, and 1,000 nits, but not for a display at 650 nits. In such cases, a receiver may decide to either select the filtering values closest to the dynamic range of the display, say, 800 nits, or it may decide to interpolate the filtering coefficients between the two available values. For example, if at 800 nits, C=[0.25, 0.25, 0.25, 0.25] and at 400 nits, C=[0.5, 0.5], then assuming a linear-interpolation model, at 600 nits, C=[⅓, ⅓, ⅓].

Depending on the capabilities of the receiving set-top box or display, trade-offs may also need to be made between speed of processing and buffering. Thus, filters may be shortened or the filtering coefficients may be selected to be powers of two.

Figure 2A:
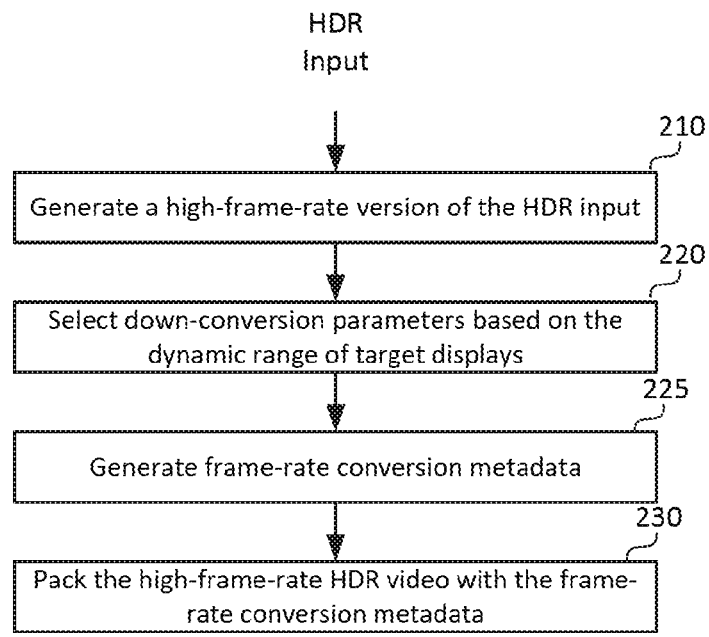
FIG. 2A depicts an example encoding process according to an embodiment of this invention.

FIG. 2A depicts an example encoding process flow according to an embodiment. Given an HDR input (e.g. 112 or 117), in step 210, a high frame-rate-version of the input is generated. Step 210 may be omitted if the input video is already available in a suitable high frame rate (e.g., 120 fps). Then, in steps (220) and (225), say, during the post-production or coding processes, a set of down-converting parameters (e.g., the down-conversion factor and the down-conversion filters) are generated for the desired "look" to a target display, according to a variety of parameters, such as, the dynamic range of the target display (e.g., maximum and minimum brightness), surround ambient conditions, and/or the specific characteristics of the video itself. All these data, collectively, represent the frame-rate conversion metadata, which, in step (230), are packed together with the high-frame-rate video to be transmitted to downstream devices, such as set-top boxes and television sets.

While discussing the coding and transmission of high-frame-video is beyond the scope of this invention, an encoder may apply traditional coding techniques, such as those used for standards-conforming frame rates, or may apply more sophisticated high-frame-rate coding techniques as presented in WIPO Publication No. WO 2017/146972, "Apparatus and Method for Encoding High Frame Rate Content in Standard Frame Rate Video Using Temporal Interlacing," which is incorporated herein by reference.

Figure 2B:
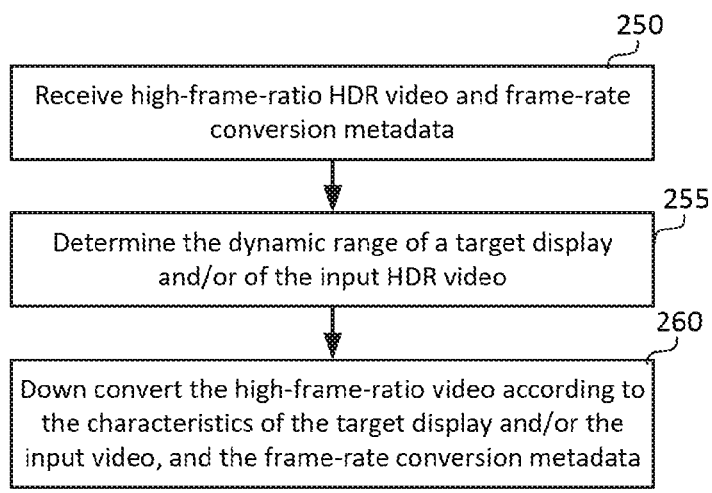
FIG. 2B depicts an example decoding process according to an embodiment of this invention.

FIG. 2B depicts an example decoding process flow according to an embodiment. In a receiver (e.g., a set-top box, a cell phone, a tablet, a TV, and the like), in step (250), the receiver accesses a high-frame rate HDR video and associated frame-rate conversion metadata. In step (255), the receiver determines the characteristics of the target display (e.g., the maximum brightness, contrast, and the like). For example, in some embodiments, such information may be retrieved through the display's extended display identification data (EDID). In some embodiments, the receiver may also take into consideration the dynamic range of the incoming video (e.g., the minimum, median (average), or maximum brightness in a scene or a frame). Then, (step 260) using at least the characteristics of the target display, the receiver may extract from the frame-rate conversion metadata the proper down-conversion factor and related down-conversion filter parameters. In some embodiments, the receiver may also take into consideration information related to the playback "priority" (e.g., video, graphics, or pixel based), the brightness of the input data, and/or the surround ambient light. The ambient light level at a target display may be an assumed value, e.g. based on knowledge of typical viewing environments, or it may be a measured value, e.g. using an ambient light sensor connected to the target display.

In an embodiment, to reduce the size of metadata related to per-pixel priorities, the alpha map may be compressed (e.g., using known compression schemes, like zip, JPEG, and the like), or it may be constrained to specific geometric shapes (say, circles or rectangles) so the map may be communicated using just a few parameters (say, width, height of a rectangle or the radius of a circle).

Frame-Rate Metadata and Judder Control

In vision science, motion artifacts in video content can be classified in a variety of ways based on distinct features of the perceivable error (e.g., non-smooth motion, flickering edges, blur, false edges or "strobing"). To simplify this discussion, such artifacts will be denoted collectively as "judder." When judder is excessive, it ruins the quality of motion in a video asset and makes the content difficult or unpleasant to watch. Details of moving objects may be lost completely, and certain scenes (camera pans, in particular) can become disturbing or even entirely unwatchable for the viewer.

Judder is widely present in modern display systems. The reason that motion artifacts are present when watching content on a display, but not when looking at real-life objects, is chiefly due to the static presentation of objects: that is, when one looks at a display what they are really seeing is a quickly changing series of static images. Even though images are swapped at a high rate (for example, at 24 Hz) there often remains a perceptible residual difference between a real-life object and its displayed counterpart. When frame rates are increased, judder is reduced or even becomes imperceptible for the viewers.

Although judder may be considered an undesirable trait if one aims to reproduce reality exactly, audiences across the world have become accustomed to a certain look when consuming cinematic content, which traditionally involves 24 Hz frame rates. This look is strongly associated with artistic presentation, movie-studio production, and cinematic quality. When the frame rate is increased, some audiences, as well as content creators, balk at the smooth motion, which is then perceived as an artifact in itself. This is referred to as the "soap opera effect," and has also been called the 'video look' associated with TV-studio or home productions. More recently, it has also been referred to as a "video-game-look." This reaction is generally not present when considering alternative forms of entertainment, such as sports or video games, where higher frame rates have become standard and judder is expected to be minimized. As such, when considering cinematic content, one sees that judder is a unique artifact that one may want to preserve, within some threshold—not too high so as to not ruin the quality of the content, but not too low or one risks making viewers unhappy with the content's new look.

An additional degree of freedom in this problem is that judder is influenced by other factors associated to the content itself and the mode of display being employed by the viewer. As described in U.S. Patent Publication No. 2017/0054938 by N. Xu et al., there are several factors that may affect judder, such as the mean and maximum luminance of the content, dynamic range, contrast, speed and direction of motion, camera angle and shutter speed, location in the field of view of the audience and of course frame rate. Interestingly, as display technologies evolve, mainly with the introduction of high dynamic range televisions and projectors, several of these factors (e.g. mean and maximum luminance, contrast, etc.) are evolving. Feedback from artists and audiences shows that movies that had desirable or acceptable judder characteristics in a traditional cinema room in the past may now appear with excessive judder when seen in HDR cinemas. This places new and restricting constraints on content creators in relation to what kind of scenes and motions can be present in their movies, effectively diminishing the HDR effect or enforcing only slow movement to be present. As appreciated by the inventors, frame-rate metadata may be used to address these issues.

Embodiments discussed so far assume that a TV or display will receive content at a high frame rate (e.g., at 120 fps) and then apply frame-rate control metadata to adjust the frame-rate as needed. Alternatively, the TV may apply a filter so that the 120 fps signal has key characteristics of the lower familiar frame rates (e.g., 24 fps). In some embodiments, a TV may receive content in a standard frame-rate (e.g., at 24, 30, or 60 fps or Hz) and then use frame-interpolation techniques to match the desired panel frame rate. These frame interpolation techniques are typically the same regardless of the pixel properties of the video, that, is they up-sample the frame rate at a constant value without taking into consideration content-specific parameters, such as maximum brightness, in a way that would preserve judder according to the director's intent.

In an embodiment, such interpolation schemes may be adjusted using frame-rate control metadata as discussed earlier. Adjustment may be enabled on a per frame, per scene, or any other suitable interval of granularity. For example, frame interpolation may apply a combination of both original (received) frames and interpolated frames using filtering or other parameters embedded in the metadata. For example, without limitation, if the input frame rate is 60 fps, and the TV interpolates to 120 fps, equation (1) may be rewritten as $$f_d(i,j) = c_0 f_I(2i,j) + c_1 \hat{f}_I(2i+,j) + c_2 \hat{f}_I(2i+1,j) + c_3 f_I(2i+1,j), \quad (6)$$

where $\hat{f}_I(i,j)$ denotes interpolated frames generated by the display based on the input $f_I(i,j)$ frames (e.g., repeated input frames, inserted black frames, motion-interpolated frames, and the like).

Figure 3A:
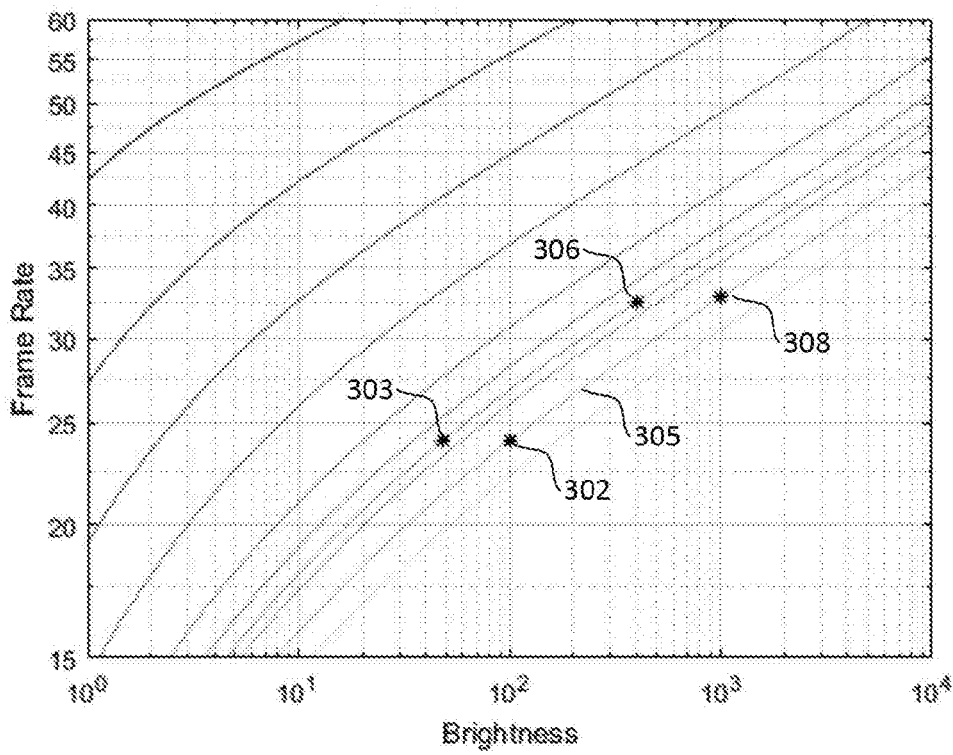
FIG. 3A and FIG. 3B depict judder contour plots as functions of brightness and frame rate according to embodiments of this invention.

Based on a series of subjective visual experiments performed by the inventors, in an embodiment, judder (J) may be described as function of frame rate and intensity, as in $$J = \frac{I(c_1 R + c_2)}{R}, \quad (7)$$

where I denotes maximum luminance, R denotes the frame rate, and $c_1$ and $c_2$ are constants for a specific type of judder as computed by fitting experimental data with equation (7). For example, FIG. 3A depicts a number of judder contour plots as functions of brightness and frame rate. Brightness is measured in nits and represents maximum luminance of the display in the "PQ" domain (SMPTE ST 2084). For example, in contour 305, point 302 represents the perceived judder of 24 Hz content on a 100 nits display. This can be considered the reference SDR judder. As depicted in FIG. 3A, at 1,000 nits (e.g., using an HDR display), to perceive the same amount of judder, the frame rate must be close to 33 Hz (point 308). Similarly, the perceived judder at 48 nits at 24 Hz (a typical movie-theater setting) (point 303) corresponds to the same judder on a display of 400 nits displaying at about 33 Hz (point 306).

Figure 3B:
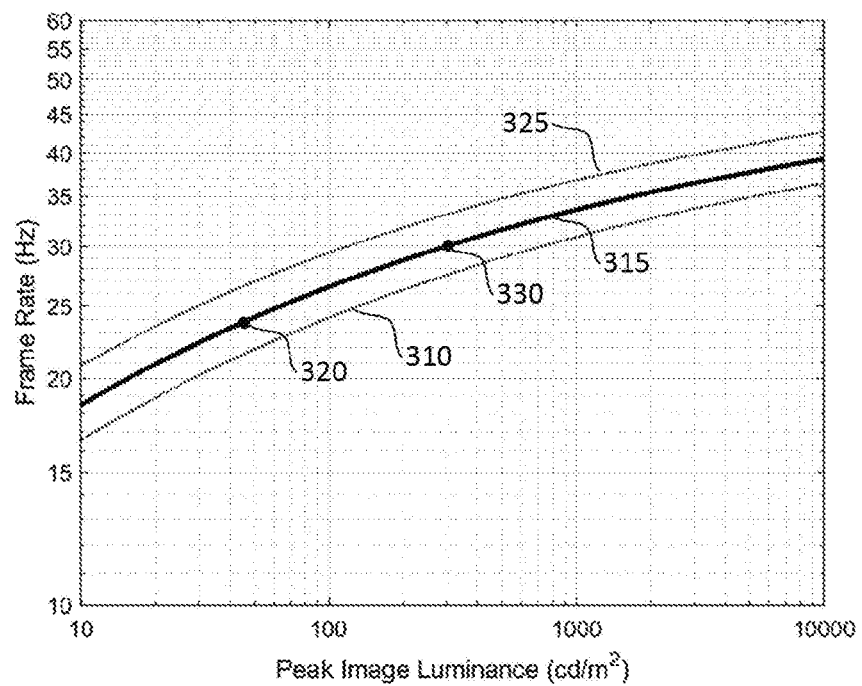

As another example, FIG. 3B depicts characterized judder for a 5-second cinematic pan (contour 310) and a 7-second pan (contour 315). These panning durations will also correspond to perceptions for an object moving from one edge of the screen to the other in the given duration. Thus, point 320 represents a cinematic motion pan at 24 fps and 48 nits (typical maximum luminance in a movie theater), which corresponds to the same perceived judder as in point 330, representing a 300 nits monitor displaying at 30 frames per second. In this example, points below contour 315 are considered to have more judder than points above the contour (e.g., points in contour 325).

Equation (7) may be applied to improve judder control in a variety of ways. In an embodiment, given a value of desired judder $J_R$ (for example, for a reference display with maximum brightness $I_R$ and a reference frame rate $R_R$), on a receiver with a target display, the receiver may: a) for a fixed brightness of the target display (say, $I_T$), and given $J_R$, solve equation (7) to determine the proper playback frame rate (say $R_T$), or b) for a fixed playback frame rate, given $J_R$, solve equation (7) to determine the maximum brightness of the display, that is:

$$R_T = \frac{I_T * c_2}{J_R - I_T * c_1}, \text{ or} \quad (8a)$$

$$I_T = \frac{J_R R_T}{(c_1 R_T + c_2)}. \quad (8b)$$

In some systems, solving equation (8a) may yield results that are beyond the capabilities of the display. Similarly, lowering the intensity beyond a certain point may compromise the "added value" of having a HDR TV in the first place. In such cases, one may hold judder constant, and iteratively adjust both the frame rate of playback and the intensity until the results satisfy the capabilities of the monitor and/or display preferences.

Persons skilled in the art will appreciate that equation (7), while simple and effective, may be replaced by higher-order polynomial models and/or other parametric representations. For example, judder models may also include parameters related to the speed of the pan under testing, image contrast, type of motion (e.g., pan or rotation), and the like. The proposed methodology is still applicable, regardless of the model representation of judder.

Judder Control Via Virtual Shutter-Angle and Frame-Rate Control

In another embodiment, the output frame rate remains fixed; however, judder is adjusted by emulating the characteristics of a virtual camera characterized by a virtual shutter angle and frame rates. This is accomplished by operating on the input frames using a combination of relatively simple operations, such as: dropping frames, repeating frames, and filtering frames. In the simplest possible implementation, filtering may be a simple averaging of the frames to be filtered; however, alternative filtering techniques, as those described earlier, are also possible.

As an example, without limitation, consider an input stream at 120 Hz. This input may be denoted as "120 fps @360°," since it represents a camera with the shutter always on. Now consider a system which drops every other frame, but repeats the remaining frames, that is, using our earlier notation, the output can be expressed as:

$$f_d(i, j) = \begin{cases} f_I(i, j), i = 0, 2, 4 \ldots \\ f_I(i-1, j), i = 1, 3, 5 \ldots \end{cases}. \quad (9)$$

This configuration may be denoted as a virtual "60 fps @180°" camera system.

Next, consider a configuration which drops every other frame but outputs a filtered version (e.g., the average) of every two frames, that is:

$$f_d(i,j) = f_d(i+1,j) = c_0 f_I(i,j) + c_1 f_I(i+1,j), \text{ for } i=0, 2, 4, \ldots \quad (10)$$

This configuration may be denoted as a virtual "60 fps@360°" camera system.

In the same spirit, and without limitation, Table 2 shows other examples of manipulating input frames and their equivalent "camera system." Each entry in the Table is characterized by the number of frames being dropped, the number of frames being filtered together, and the virtual camera system configuration with its virtual shutter system and virtual frame rate.

Each of these configurations is expected to have a different effect on perceived judder, thus, a content creator may select a particular configuration that best meets the director's intent for visual judder. The selected configuration may be passed downstream to a receiver using frame-rate metadata.

TABLE 2

Judder Control Options via a Virtual Camera Set-up for 120 Hz Input

| No. | Dropped frames | Filtered frames | Virtual Frame rate | Virtual shutter-angle |
|---|---|---|---|---|
| 1 | none | none | 120 | 360 |
| 2 | 1 | none | 60 | 180 |
| 3 | 1 | 2 | 60 | 360 |
| 4 | 2 | none | 40 | 120 |
| 5 | 2 | 2 | 40 | 240 |
| 6 | 2 | 3 | 40 | 360 |
| 7 | 3 | none | 30 | 90 |
| 8 | 3 | 2 | 30 | 180 |
| 9 | 3 | 3 | 30 | 270 |
| 10 | 3 | 4 | 30 | 360 |
| 11 | 4 | none | 24 | 72 |
| 12 | 4 | 2 | 24 | 144 |
| 13 | 4 | 3 | 24 | 216 |
| 14 | 4 | 4 | 24 | 288 |
| 15 | 4 | 5 | 24 | 360 |

Such a methodology emulates how a physical camera would have captured the screen, but may provide limited options to characterize judder, especially for lower frame rates, say at 60 fps.

Judder Control Via Non-Smooth Motion

Figure 4:
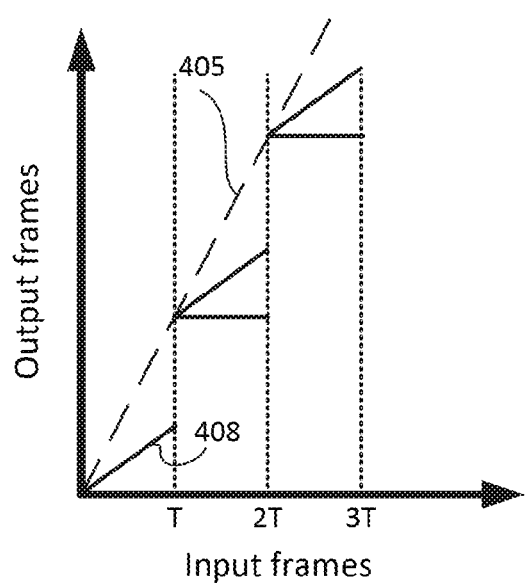
FIG. 4 depicts an example of a method to control judder by introducing non-smooth motion.

In U.S. Patent Publication No. 2017/0264861 (to be referred as the '861 Publication), Xu et al. proposed a method to control judder by introducing non-smooth motion. An example of this method is illustrated in FIG. 4. Consider an input-output frame-rate relationship, with no judder, characterized by the slope of line 405. Consider also a time interval T. In an embodiment, if the input content is played at a slower speed in each period T (e.g., at a rate characterized by the slope of line 408), then, at the end of each time segment T there should be a jump forward to catch up with the real playback time. In such a scenario, an object that is moving smoothly is displayed at a lower speed within time T and then it is displayed as jumping to a new location at the start of the next time period. This jumping is perceived as non-smooth motion, which is a key contributor to judder. The amount of the resulting perceived judder can be controlled by the slope of line 408, which, in reference to the slope of line 405, can take values from 0 (maximum possible judder) to 1 (no judder).

As discussed in the '861 Publication, this slope, referred to as the Judder Control Rate (JCR), can be determined at the content production end and can be transmitted together with the video data as metadata. In a receiver, the display's frame rate controller can then read the JCR values and adjust the playback as needed.

In an embodiment, these JCR values or the virtual-camera settings of Table 2 may also be mapped to a set of virtual frame rates values ($R_V$) to be used in combination with the judder model of equation (7), e.g.:

$$J = \frac{I(c_1 R_V + c_2)}{R_V}. \tag{11}$$

As used herein, the term "trim-pass" denotes a phase in content post-production wherein a video stream created for a first target display format (say, a professional monitor at 4,000 nits) is regraded by a coloring artist into a second target display format (say, for an SDR TV at 300 nits). A studio may create multiple "trims," such as, trims for releases in SDR movie theaters (48 nits), HDR movie theaters (e.g., 100 nits), SDR TVs (e.g., 300 nits), HDR TVs (e.g., 1,000 nits), and the like. Given an input video at a specified trim, a TV may apply display management techniques to map the maximum intensity of the input data to the dynamic range of the target TV. A similar approach may also be used to generate TV-specific virtual frame rates values given $R_V$ values for known trims. For example, if a receiver receives a table with pairs of Intensity and $R_V$ values (e.g., pairs I(i), R(i)) characterizing the desired judder for each trim, then for a target display with $I(i) \leq I_T \leq I(i+1)$, using linear interpolation, the target $R_V$ value ($R_{VT}$) may be expressed as $$R_{VT} = (1-a) * R(i) + a * R(i+1), \tag{12a}$$

where $$a = \frac{I_T - I(i)}{I(i+1) - I(i)}. \tag{12b}$$

This $R_{VT}$ value may now be used to determine the best frame rate playback or maximum brightness to match the preferred level of judder.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to frame-rate-conversion metadata, such as those described herein. The computer and/or IC may compute any of a variety of parameters or values that relate to image transformation processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to frame-rate-conversion metadata as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Various aspects of the present disclosure will be appreciated from the following list of enumerated example embodiments (EEEs):

EEE1. A method to encode a high-dynamic range (HDR) video signal, the method comprising:
  accessing a high-frame-rate HDR video;
  determining a set of frame-rate down-conversion parameters for the high frame-rate HDR video based at least on the maximum brightness of a target display;
  generating frame-rate-conversion metadata based on the frame-rate down-conversion parameters; and
  generating a coded bitstream based on the high-frame-rate HDR video and the frame-rate-conversion metadata.

EEE2. The method of EEE 1, wherein the set of frame-rate down-conversion parameters comprises a down-conversion factor for determining the video playback frame rate, and down-conversion filtering coefficients.

EEE3. The method of EEE 1, wherein the frame-rate down-conversion parameters are also based on a value of the surrounding ambient light in the target display.

EEE4. The method of EEE 1, wherein the frame-rate down-conversion parameters are also based on a display playback priority mode, wherein the display playback priority mode comprises one or more of a video priority mode, a graphics priority mode, a transition priority mode, or a pixel-based priority mode.

EEE5. The method of EEE 4, wherein under the pixel-based priority mode the frame-rate down-conversion parameters include separate sets of down-conversion filtering coefficients for graphics pixels and for video pixels.

EEE6. The method of EEE 5, wherein a video pixel is determined to be a graphics pixel or a video pixel according to an alpha mask.

EEE7. The method of EEE 6, wherein the alpha mask is included in the frame-rate-conversion metadata.

EEE8. The method of EEE 1, wherein the frame-rate-conversion metadata are determined at the sequence level, the scene level, or the frame level of the high-frame-rate HDR video.

EEE9. A method to decode a high-dynamic range (HDR) video signal, the method comprising:
 receiving an input HDR video signal encoded in an input high-frame rate;
 receiving frame-rate-conversion metadata associated with the input video signal;
 determining the maximum brightness of a target display;
 determining a set of frame-rate down-converting parameters based at least on the maximum brightness of the target display and the frame-rate-conversion metadata; and
 generating an output video signal for the target display at an output frame rate based on the input video signal and the set of frame-rate down-converting parameters.

EEE10. The method of EEE 9, wherein the set of frame-rate down-conversion parameters comprises a down-conversion factor for determining the output frame rate, and down-conversion filtering coefficients.

EEE11. The method of EEE 9, wherein the frame-rate down-conversion parameters are also based on a value of the surrounding ambient light in the target display.

EEE12. The method of EEE 9, wherein the frame-rate down-conversion parameters are also based on a display priority mode, wherein the display priority mode includes one or more of a video priority mode, a graphics priority mode, a transition priority mode, or a pixel-based priority mode.

EEE13. The method of EEE 12, wherein under the pixel-based priority mode the frame-rate down-conversion parameters include separate down-converting filtering coefficients for graphics pixels and for video pixels.

EEE14. The method of EEE 13, wherein a video pixel is determined to be a graphics pixel or a video pixel according to an alpha mask.

EEE15. The method of EEE 14, wherein the alpha mask is included in the frame-conversion metadata.

EEE16. The method of EEE 9, wherein the frame-conversion metadata are determined at the sequence level, the scene level, or the frame level of the high-frame-rate HDR video.

EEE17. The method of EEE 1 or EEE 9, wherein the frame-rate down-conversion parameters also comprise one or more of a judder value, a virtual camera configuration value, a judder control rate value, or a virtual frame rate value, wherein
 the judder value represents perceived judder according to a judder model based on a maximum brightness value and a playback frame rate,
 the virtual camera configuration value represents one or more filtering operations to be performed on frames of the input HDR video signal,
 the judder control rate value represents a slope value between 0 and 1 characterizing a playback frame rate with respect to a reference, judder-free, frame rate, and
 a virtual frame rate value representing desired judder according to a virtual camera configuration value or a judder control rate value.

EEE18. The method of EEE 17, wherein computing a judder value (J) according to the judder model comprises computing $$J = \frac{I(c_1 R + c_2)}{R},$$

where R denotes the playback frame rate, I denotes the maximum brightness, and $c_1$ and $c_2$ are constants.

EEE19. The method of EEE 18, wherein given a judder value $J_R$, judder model coefficients $c_1$ and $c_2$, and a maximum brightness $I_T$ for a target display, an output video signal for the target display is displayed at a rate $$R_T = \frac{I_T * c_2}{J_R - I_T * c_1}.$$

EEE20. The method of EEE 18, wherein given a judder value $J_R$, judder model coefficients $c_1$ and $c_2$, and a target frame rate $R_T$ for a target display, an output video signal for the target display is displayed at a maximum brightness given by $$I_T = \frac{J_R R_T}{(c_1 R_T + c_2)}.$$

EEE21. The method of EEE 17, wherein given a set of pairs of brightness values and corresponding virtual frame rate values (I(i), R(i)) characterizing preferred judder values of a set of trims, for a display with maximum brightness $I(i) \leq I_T \leq I(i+1)$, its corresponding virtual frame rate ($R_{VT}$) may be computed as $$R_{VT} = (1-a) * R(i) + a * R(i+1),$$

where $$a = \frac{I_T - I(i)}{I(i+1) - I(i)}.$$

EEE22. The method of EEE 17 wherein the maximum brightness corresponds to the maximum value of the target display or the maximum brightness of a frame or a group of frames in the HDR video signal.

EEE23. An apparatus comprising a processor and configured to perform any one of the methods recited in EEEs 1-22.

EEE24. A non-transitory computer-readable storage medium having stored thereon computer-executable instruction for executing a method with one or more processors in accordance with any one of the EEEs 1-22.

EQUIVALENTS, EXTENSIONS, ALTERNATIVES AND MISCELLANEOUS

Example embodiments that relate to frame-rate-conversion metadata are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to encode a high-dynamic range (HDR) video signal, the method comprising:
    accessing an HDR video signal encoded at a first frame rate;
    determining a set of frame-rate down-conversion parameters suitable for adapting the HDR video signal for playback at a second frame rate, the second frame rate being lower than the first frame rate,
    wherein the set of frame-rate down-conversion parameters comprises: (i) a down-conversion factor for determining, at a target display, the second frame rate based at least on a function of maximum brightness of the target display, where the second frame rate increases with the maximum brightness; or (ii) metadata from which the down-conversion factor can be obtained;
    generating frame-rate-conversion metadata based on the set of frame-rate down-conversion parameters; and
    generating a coded bitstream comprising the HDR video signal and the frame-rate-conversion metadata.

2. The method of claim 1, wherein the set of frame-rate down-conversion parameters comprises coefficients for a down-conversion filter, the down-conversion filter being suitable for adapting the HDR video signal for playback, at the target display, at the second frame rate.

3. The method of claim 1, wherein the set of frame-rate down-conversion parameters is determined based also on at least one of:
    the minimum brightness of the target display;
    an ambient light level at the target display; and
    a display playback priority mode of the target display.

4. The method of claim 3, wherein the display playback priority mode comprises one or more of a video priority mode, a graphics priority mode, a transition priority mode, or a pixel-based priority mode.

5. The method of claim 4, wherein under the pixel-based priority mode the set of frame-rate down-conversion parameters includes first and second sets of coefficients for the down-conversion filter, the first set of coefficients being for graphics pixels, the second set of coefficients being for video pixels.

6. The method of claim 5, wherein a video pixel is determined to be a graphics pixel or a video pixel according to an alpha mask.

7. The method of claim 6, wherein the alpha mask is included in the frame-rate-conversion metadata.

8. The method of claim 1, wherein the frame-rate-conversion metadata are determined at the sequence level, the scene level, or the frame level of the accessed HDR video.

9. The method of claim 1, wherein the frame-rate down-conversion parameters also comprise one or more of a judder value, a virtual camera configuration value, a judder control rate value, or a virtual frame rate value, wherein
    the judder value represents perceived judder according to a judder model based on a maximum brightness value and a playback frame rate,
    the virtual camera configuration value represents one or more filtering operations to be performed on frames of the input HDR video signal,
    the judder control rate value represents a slope value between 0 and 1 characterizing a playback frame rate with respect to a reference, judder-free, frame rate, and
    a virtual frame rate value representing desired judder according to a virtual camera configuration value or a judder control rate value.

10. The method of claim 9, wherein computing a judder value (J) according to the judder model comprises computing $$J = \frac{I(c_1 R + c_2)}{R},$$

where R denotes the playback frame rate, I denotes the maximum brightness, and $c_1$ and $c_2$ are constants.

11. The method of claim 10, wherein given a judder value $J_R$, judder model coefficients $c_1$ and $c_2$, and a maximum brightness $I_T$ for a target display, an output video signal for the target display is displayed at a rate $$R_T = \frac{I_T * c_2}{J_R - I_T * c_1}.$$

12. The method of claim 10, wherein given a judder value $J_R$, judder model coefficients $c_1$ and $c_2$, and a target frame rate $R_T$ for a target display, an output video signal for the target display is displayed at a maximum brightness given by $$I_T = \frac{J_R R_T}{(c_1 R_T + c_2)}.$$

13. The method of claim 9, wherein given a set of pairs of brightness values and corresponding virtual frame rate values (I(i), R(i)) characterizing preferred judder values of a set of trims, for a display with maximum brightness I(i) ≤$I_T$≤I(i+1), its corresponding virtual frame rate ($R_{VT}$) may be computed as $$R_{VT} = (1-a) * R(i) + a * R(i+1),$$

where $$a = \frac{I_T - I(i)}{I(i+1) - I(i)}.$$

14. The method of claim 9 wherein the maximum brightness corresponds to the maximum value of the target display or the maximum brightness of a frame or a group of frames in the HDR video signal.

15. An apparatus comprising a processor and configured to perform the method recited in claim 1.

16. A non-transitory computer-readable storage medium having stored thereon computer-executable instruction for executing a method with one or more processors in accordance with claim 1.

17. A method to decode a high-dynamic range (HDR) video signal, the method comprising:
receiving an input HDR video signal encoded at a first frame rate;
receiving frame-rate-conversion metadata associated with the input HDR video signal;
determining the maximum brightness of a target display;
determining a set of frame-rate down-converting parameters based at least on the frame-rate-conversion metadata, the set of frame-rate down-converting parameters being suitable for adapting the input HDR video signal for playback at a second frame rate, the second frame rate being lower than the first frame rate,
wherein the set of frame-rate down-conversion parameters comprises: (i) a down-conversion factor for determining, at the target display, the second frame rate in dependence on the maximum brightness of the target display, whereby the second frame rate increases with maximum brightness; or (ii) metadata from which the down-conversion factor can be obtained; and
generating an output video signal for the target display at the second frame rate based at least on the input video signal and the set of frame-rate down-converting parameters.

18. The method of claim 17, wherein the set of frame-rate down-conversion parameters comprises coefficients for a down-conversion filter, the down-conversion filter being suitable for adapting the input HDR video signal for playback, at the target display, at the second frame rate.

19. The method of claim 17, wherein the set of frame-rate down-conversion parameters is based on at least one of:
the minimum brightness of the target display;
an ambient light level at the target display; and
a display playback priority mode of the target display.

20. The method of claim 19, wherein the display playback priority mode includes one or more of a video priority mode, a graphics priority mode, a transition priority mode, or a pixel-based priority mode.

21. The method of claim 20, wherein under the pixel-based priority mode the set of frame-rate down-conversion parameters include first and second sets of coefficients for the down-conversion filter, the first set of coefficients being for graphics pixels, the second set of coefficients being for video pixels.

22. The method of claim 21, wherein a video pixel is determined to be a graphics pixel or a video pixel according to an alpha mask.

23. The method of claim 22, wherein the alpha mask is included in the frame-rate-conversion metadata.

24. The method of claim 17, wherein the frame-rate-conversion metadata are determined at the sequence level, the scene level, or the frame level of the input HDR video.

* * * * *